J. SCHROEDER.
FLYING MACHINE.
APPLICATION FILED MAY 2, 1913.

1,106,061.

Patented Aug. 4, 1914.

Witnesses:
J. Ellis Glen.
Anthony Marx

Inventor:
Josef Schroeder,
by: Albert S. Davis
His Attorney.

UNITED STATES PATENT OFFICE.

JOSEF SCHROEDER, OF TEGEL, GERMANY, ASSIGNOR TO GENERAL ELECTRIC COMPANY, A CORPORATION OF NEW YORK.

FLYING-MACHINE.

1,106,061. Specification of Letters Patent. Patented Aug. 4, 1914.

Application filed May 2, 1913. Serial No. 765,151.

*To all whom it may concern:*

Be it known that I, JOSEF SCHROEDER, a subject of the King of Prussia, residing at Tegel, Germany, have invented certain new and useful Improvements in Flying-Machines, of which the following is a specification.

The present invention relates to that type of flying machines having wings on each side of the frame, and extending transversely to the direction of flight, said wings being pivotally supported or hinged at or near their forward edges and elastically supported at some point in the rear thereof. More specifically my invention relates to these elastic supports and has for its object to improve their construction and arrangement whereby the lower or supporting span wires will be maintained under constant tension.

For a consideration of what I believe to be novel and my invention, attention is directed to the accompanying description and claims appended thereto.

Figure 1:
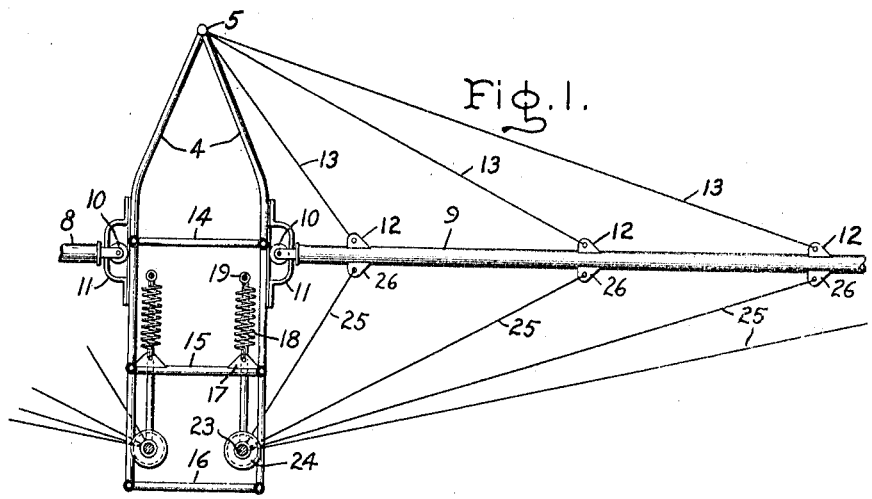
Figure 2:
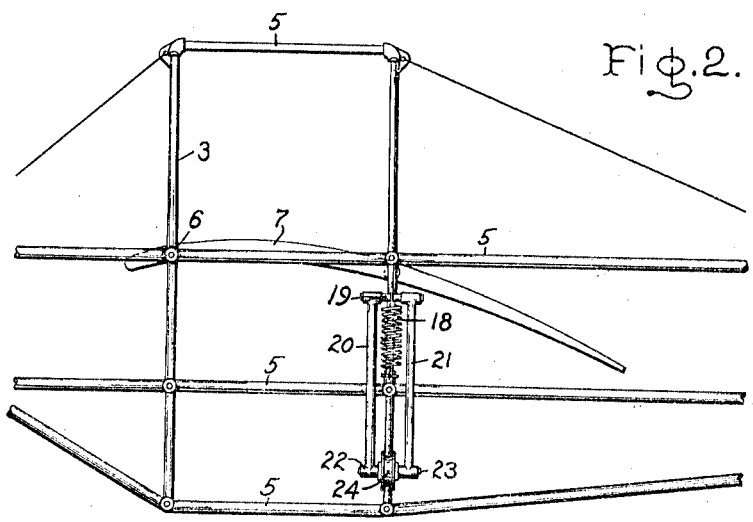

In the accompanying drawing which is illustrative of one of the embodiments of my invention, Figure 1 is a partial vertical sectional view of the rear part of a flying machine, and Fig. 2 is a partial side view of the machine showing the right-hand wing.

The frame of the machine can be made in any suitable way but the arrangement shown in the drawing has been found satisfactory. It comprises two vertically disposed frames 3 and 4 connected by fore and aft braces 5 which may be extended as shown to support other parts of the apparatus. The frame and braces may be made of any suitable material, such as thin tubing for example. Extending perpendicular to the frame 3 is a fixed pivot or fulcrum 6 for the wing 7. As the arrangement of both wings is alike a description of one will suffice. Each wing is substantially rectangular in form and its pivot is located near the front edge. The pivot is suitably braced by span wires, not shown, to keep the same from buckling. At some point in the rear of the pivot and extending parallel therewith are movable members 8 and 9 which yield upwardly when the wind pressure on the under side of the wings exceeds a predetermined amount. They also serve as braces for the wings. The varied movements of the members are opposed by springs that are designed to normally hold the rear ends of the wings depressed but which when the pressure of the air currents under the wings becomes too great will yield to an extent determined by said pressure. The problem is therefore how to movably attach the members to the frame and at the same time guide them in their vertical movements and also keep the lower stay-wires, which carry a large portion of the weight, taut at all times and thus prevent them from being broken when the wing is suddenly moved upward. On the end of each member adjacent the upright frame bars is a roller 10 arranged to move up and down in a holder 11 fastened to the frame 4. This holder is closed at all points to prevent the roller from getting out of place. On the upper side of the member are ears 12 and these are connected by span-wires 13 with the upper end of the frame 4 where it unites with the top fore and aft brace 5. The vertical members of the frame 4 are connected by cross-pieces 14, 15 and 16. To the cross-piece 15 is attached an ear 17 and connected thereto is the lower end of a coiled extension spring 18. The upper end of the spring is attached to a yoke 19. Extending downwardly from the yoke are rods 20 and 21. The lower ends of the rods are united by a cross-head 22 that contains the pivot 23 of the roller 24, the latter being held in engagement with and guided by one of the vertical frame tubes and arranged to roll in a vertical direction thereon. To the cross-head 22 or other part moving therewith are connected a number of stay-wires 25 whose outer ends are attached to ears 26 fastened to the member 9. It will be seen that the weight of the main frame is transmitted to the wings, when the machine is in flight, through the pivots 6, yoke 19, cross-head 22 and springs 18. The upper stay-wires 13 are so adjusted that in the lowest position of the members 8 and 9 and hence of the lowest inclination of the wings 7 they are taut, becoming loose when the rear ends of the wings and the members 8 and 9 move upwardly as the springs yield under wind pressure. As the wings swing about their forward pivots the members 8 and 9 move up and down in a vertical direction and with them the cross-head 22 or other part to which the lower stay-wires are connected. This means that each of the lower stay-wires is kept under the same tension all of the time instead of changing with changes in position of the wings. This arrangement decreases the liability of the stay-wires breaking. The upper stay-wires 13 become more or less slack as the rear end of each wing moves upwardly but this is not objectionable for they are not carrying any weight at the time.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a flying machine, the combination of a frame, wings therefor, a pivot for attaching each wing to the frame, said wing being adapted to move angularly on the pivot, and means for yieldingly supporting the rear portion of each wing comprising a spring that is supported by the frame, a means supported by the spring and movable with respect to the frame, a member extending longitudinally of the wing and movable vertically on the frame and stay-wires which connect said means with the member.

2. In a flying machine, the combination of a frame, wings therefor, means for pivotally attaching the wings to the frame, and means for yieldingly supporting the rear portion of each wing comprising a member attached to the wing which engages the frame and is movable vertically thereon, a spring, one end of which is supported by the frame, a movable means supported by the other end of the spring, and stay-wires that are connected to the member and the movable means.

3. In a flying machine, the combination of a frame, a wing on each side thereof and pivotally attached thereto, a member that is attached to and moves with each wing as the latter turns on its pivot, a holder for guiding the end of the member adjacent the frame which permits the member to move vertically relative to the frame, a means yieldingly supported by the frame which is maintained in fixed relation to said member, and diagonal stay-wires that connect the means with the member.

4. In a flying machine, the combination of a frame, a wing on each side thereof and pivotally attached thereto, a member that is attached to and moved with each wing, a roller on one end of the member for guiding it on the frame, a second roller that is also guided on the frame, a spring for supporting the second roller, and stay-wires that unite the second roller with the member.

5. In a flying machine, the combination of a frame, a wing on each side thereof which is pivotally secured thereto, said pivot being located at the front edge of the wing, a member which is attached to the wing in the rear of the pivot, means for transmitting the end thrust of the member to the frame and which permits said member to move vertically with respect to the frame, a means that is movably supported on the frame, stay-wires connecting the means to a plurality of points on the member, and a spring that is carried by the frame for supporting said means.

6. In a flying machine, the combination of a frame, a wing on each side thereof which is pivotally secured thereto, the rear portion of said wing being arranged to move up and down in response to changes in pressure on its under side, and a means for yieldingly supporting the rear portion of said wing comprising a member extending longitudinally of the wing, means carried by the frame for guiding the member to permit it to move vertically with respect to the frame, stay-wires connecting the member to the upper portion of the frame, an element that is movable on the frame, a spring supported by the frame and sustaining said element, stay-wires that are connected to the element and extend upwardly to the member and are attached thereto at a number of separated points.

7. In a flying machine, the combination of a frame, a wing on each side thereof which is pivotally secured thereto, the rear portion of said wing being arranged to move up and down in response to changes in pressure on its under side, and a means for yieldingly supporting the rear portion of said wing comprising a member extending longitudinally of the wing, stay-wires connecting the member to the upper portion of the frame, a roller that moves on the frame, a pivot therefor, a yoke, rods connecting the yoke and the pivot, a spring that is attached to the frame at one end and to the yoke at the other, and stay-wires connecting the roller with said member.

In witness whereof, I have hereunto set my hand this 15 day of April, 1913.

JOSEF SCHROEDER.

Witnesses:
PAUL STUMPF,
RICHARD SCHWINN.

Correction in Letters Patent No. 1,106,061.

It is hereby certified that in Letters Patent No. 1,106,061, granted August 4, 1914, upon the application of Josef Schroeder, of Tegel, Germany, for an improvement in "Flying-Machines," an error appears in the printed specification requiring correction as follows: Page 1, line 54, for the word "varied" read *vertical;* and that the said Letters Patent should be read with this correction therein that the same may conform to the record of the case in the Patent Office.

Signed and sealed this 29th day of September, A. D., 1914.

[SEAL.]
R. F. WHITEHEAD,
*Acting Commissioner of Patents.*